United States Patent [19]

Meyer

[11] 4,103,672
[45] Aug. 1, 1978

[54] SOLAR COLLECTOR

[76] Inventor: Warren A. Meyer, 8612 Bellehaven Pl., N.E., Albuquerque, N. Mex. 87112

[21] Appl. No.: 688,830

[22] Filed: May 21, 1976

[51] Int. Cl.$^2$ .............................................. F24J 3/02
[52] U.S. Cl. .................... 126/270; 237/1 A; 350/293
[58] Field of Search ............... 126/270, 271; 237/1 A; 350/293

[56] References Cited

U.S. PATENT DOCUMENTS

| 503,004 | 8/1893 | Severy | 126/270 |
|---|---|---|---|
| 1,951,404 | 3/1934 | Goddard | 126/270 |
| 3,847,136 | 11/1974 | Salvail | 126/271 |
| 4,000,734 | 1/1977 | Mattlock et al. | 126/271 |

Primary Examiner—Kenneth W. Sprague
Attorney, Agent, or Firm—Clarence A. O'Brien; Harvey B. Jacobson

[57] ABSTRACT

A solar collector having a reflector element biased toward a parabolic shape by means of forces applied to peripheral edges of the element. The forces can be opposed straight line forces, opposite acting torsion forces, or both, and if a flexible sheet is employed as the reflector element, the forces can be supplemented by resilient elements which tension the sheet in the direction perpendicular to the curvature thereof and help retain the sheet in its desired parabolic shape.

11 Claims, 12 Drawing Figures

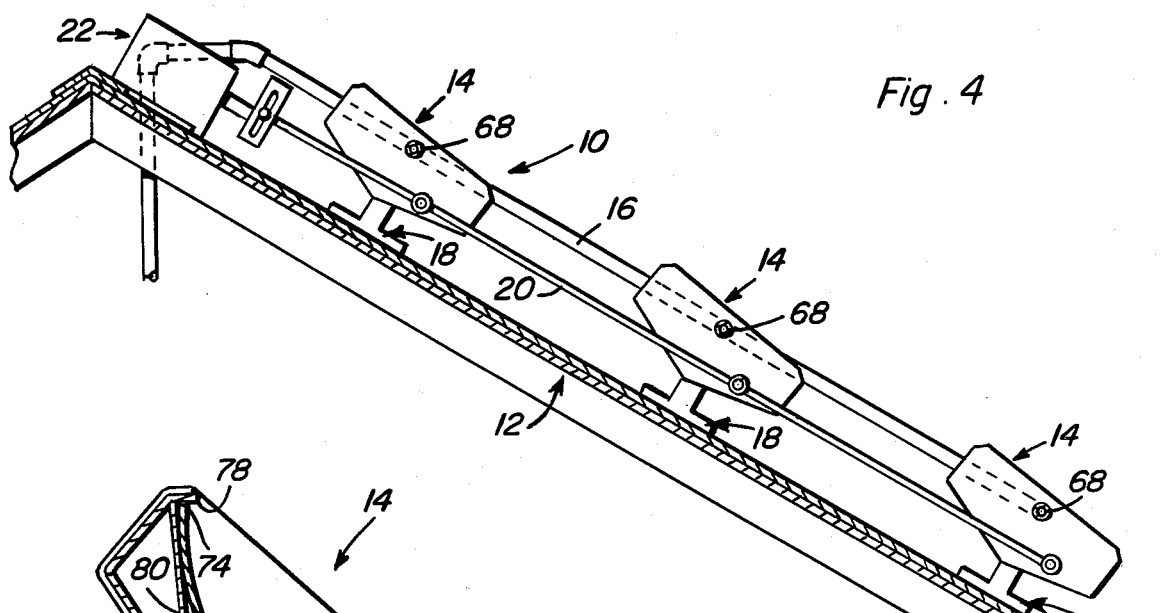
Fig. 4
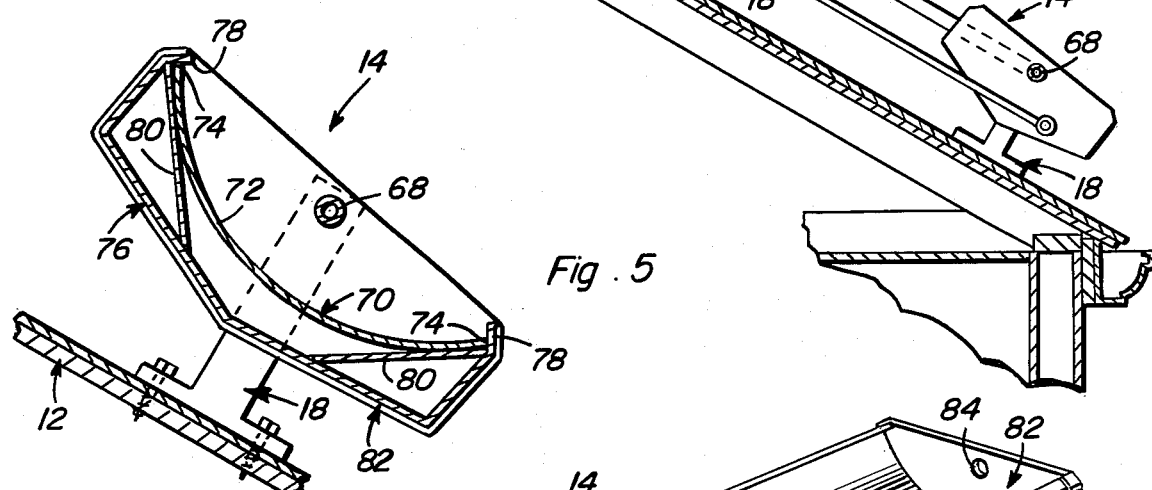
Fig. 5
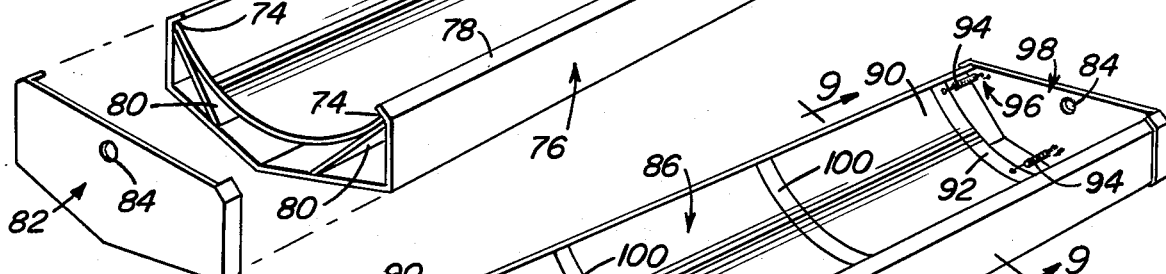
Fig. 6
Fig. 7

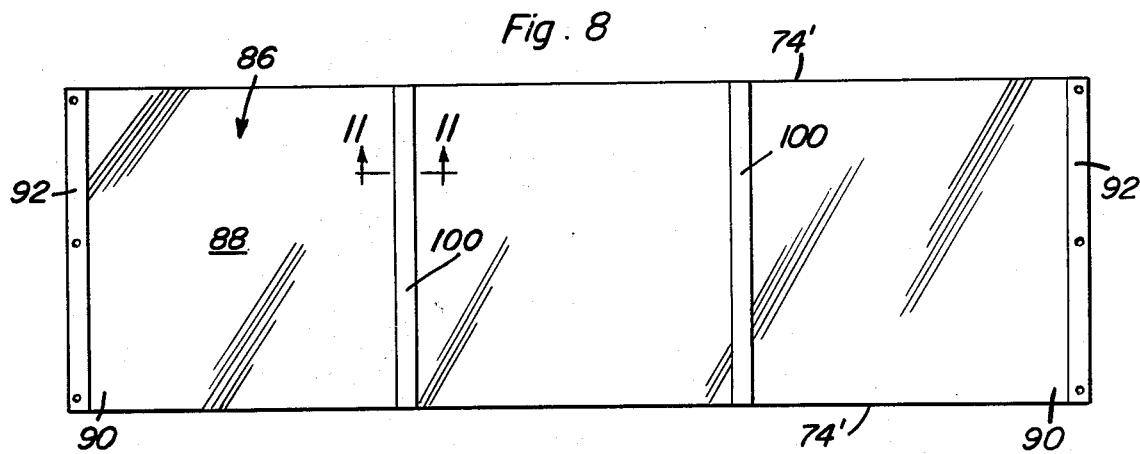
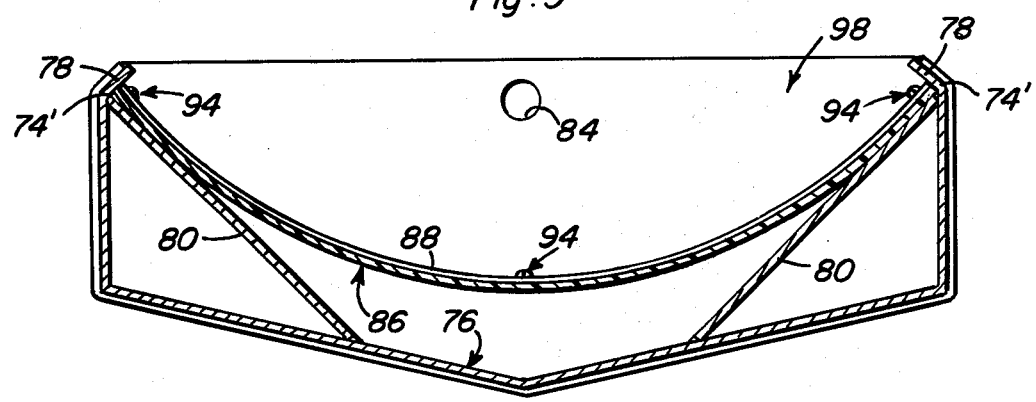
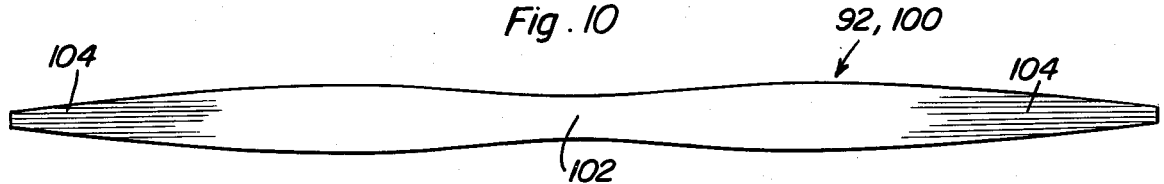
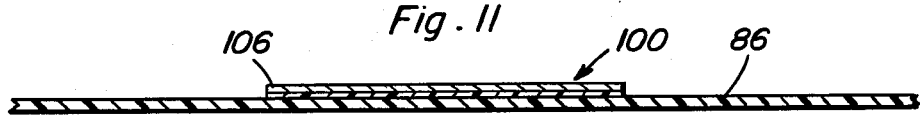
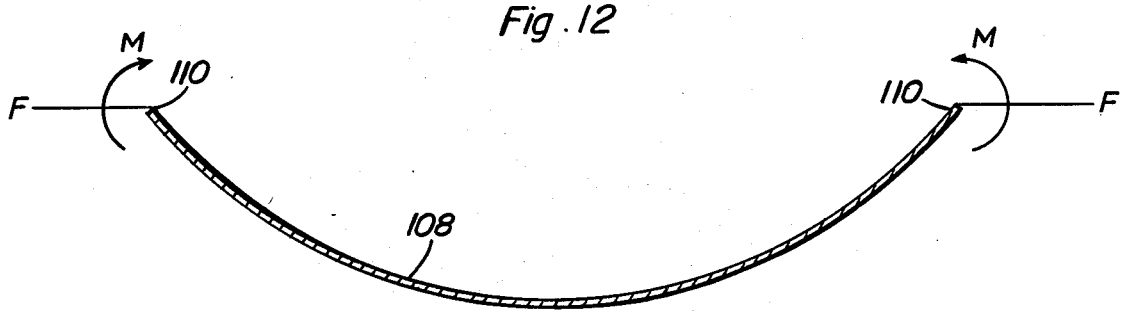

SOLAR COLLECTOR

BACKGROUND OF THE INVENTION

1. Field of the Invention

This invention relates generally to solar energy collecting devices, and particularly to the formation of a reflector for use with a concentrating type collector for solar energy applications.

2. Description of the Prior Art

Concentrating collectors are generally known in which a reflecting surface of suitable shape is used to reflect parallel sun rays onto a heat absorbing element. Generally and ideally, the reflector surface is manufactured in a shape with parabolic cross-section. It is well known that this shape will focus parallel rays of light onto a single line. The parabolic shape permits the most versatility of design along with obtainment of the highest temperatures on the heat-absorbing element. Although the parabolic shape is ideal, however, it presents certain manufacturing difficulties and, thus, can result in costly fabrication techniques. Various examples of the use of parabolic and similar reflectors mounted on the roof of a residence or other building as part of an integrated building space and water heating system can be found in prior patents as follows:

U.S. Pat. No. 1,014,927 — Jan. 16, 1912
U.S. Pat. No. 1,093,925 — Apr. 21, 1914
U.S. Pat. No. 1,162,505 — Nov. 30, 1915
U.S. Pat. No. 1,683,266 — Sep. 4, 1928
U.S. Pat. No. 2,133,649 — Oct. 18, 1938
U.S. Pat. No. 2,467,885 — Apr. 19, 1949
U.S. Pat. No. 2,857,634 — Oct. 28, 1959
U.S. Pat. No. 2,872,915 — Feb. 10, 1959
U.S. Pat. No. 3,058,394 — Oct. 16, 1962
U.S. Pat. No. 3,321,012 — May 23, 1967.

SUMMARY OF THE INVENTION

It is an object of the present invention to provide a reflector for use with a concentrating type solar collector which is simplier and less expensive of construction than conventional reflectors of this kind, but still approximates a parabolic contour closely enough for efficient operation of the solar collector.

It is another object of the present invention to provide a solar collector which can be employed in various solar energy systems.

It is yet another object of the present invention to provide a solar collector which can employ interchangeably reflector surface forming elements constructed in various lightweight and inexpensive ways, without requiring expensive manufacturing techniques for forming the reflector element into a substantially parabolic shape and mounting the element within a support portion of the collector.

These and other objects are achieved according to the present invention by providing a solar collector having: a heat collector; a reflector arrangement disposed for directing radiation from the sun onto the heat collector; and a support assembly mounting the heat collector and the reflector arrangement in such a manner that opposed forces are exerted on the reflector arrangement for biasing the reflector arrangement toward a parabolic contour focusing rays toward the heat collector.

More specifically, the reflector arrangement includes a substantially rectangular, normally substantially planar reflector element, including a pair of spaced, parallel, peripheral edges, with the support assembly including a pair of spaced, opposed attachment points connected to the peripheral edges of the reflector element. By proper dimensioning, the attachment points are spaced from one another a distance less than a distance between the peripheral edges of the reflector element for biasing the reflector surface of the element toward the desired parabolic contour. Thus, while the exact contour of the reflector surface will not correspond to a true parabolic curve, especially near the peripheral edges, the resulting contour of the reflector surface will sufficiently approximate a parabolic curve to permit efficient heat gathering by the heat collector.

In addition to the aforementioned forces applied to peripheral edges of the reflector element, which forces are essentially opposed straight line forces, it is also possible to cause the desired bending of the reflector element by the application to the peripheral edges thereof of opposed torsional moments. Such rotating forces, or couples, applied along the edges of a reflector element, especially when they are used independently of other forces, have the advantage of adding additional curvature to the reflector shape, particularly in the vicinity of the edges of the reflector element, and thus improve the ray concentration within the focal region of the reflector surface.

While the reflector element may be a single sheet of a resilient material, such as a suitable metal, that will resist the forces applied to the edges thereof, it is also possible to construct the reflector element as a composite structure. In particular, it is contemplated by the invention that the reflector element could be a sheet of flexible material, such as a sheet of a suitable synthetic material, bonded at ends thereof to strips of a resilient material which will be bent into the desired semi-parabolic shape in order to provide the flexible sheet itself with a similar contour. Springs, and the like, may be attached to the ends of the flexible sheet, or more specifically to the strips disposed at the ends of the sheet, in order to place the sheet under tension in the direction transverse to the curvature of the sheet and assure that the sheet will remain in its desired shape.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a fragmentary, enlarged, sectional view taken generally along the line 4—4 of FIG. 1.

FIG. 5 is a fragmentary, enlarged, sectional view taken generally along the line 5—5 of FIG. 1.

FIG. 6 is a partly exploded, perspective view showing a solar collector according to the present invention with the heat collector removed.

FIG. 7 is an exploded, perspective view, similar to FIG. 6, but showing a second preferred embodiment of the invention.

FIG. 8 is a top plan view showing the reflector arrangement of the embodiment of FIG. 7.

FIG. 9 is an enlarged, sectional view taken generally along the line 9—9 of FIG. 7.

FIG. 10 is a plan view showing a preferred embodiment of a reflector element shaping strip employed with the embodiment shown in FIGS. 7 through 9.

FIG. 11 is an enlarged, fragmentary, sectional view taken generally along the line 11—11 of FIG. 8.

FIG. 12 is a partly schematic, transverse sectional view showing a third embodiment of the present invention wherein the reflector element is subjected to moments, or couples, along the edges thereof in order to force the reflector element to approximate a parabolic curve in section.

DESCRIPTION OF THE PREFERRED EMBODIMENTS

Figure 1:
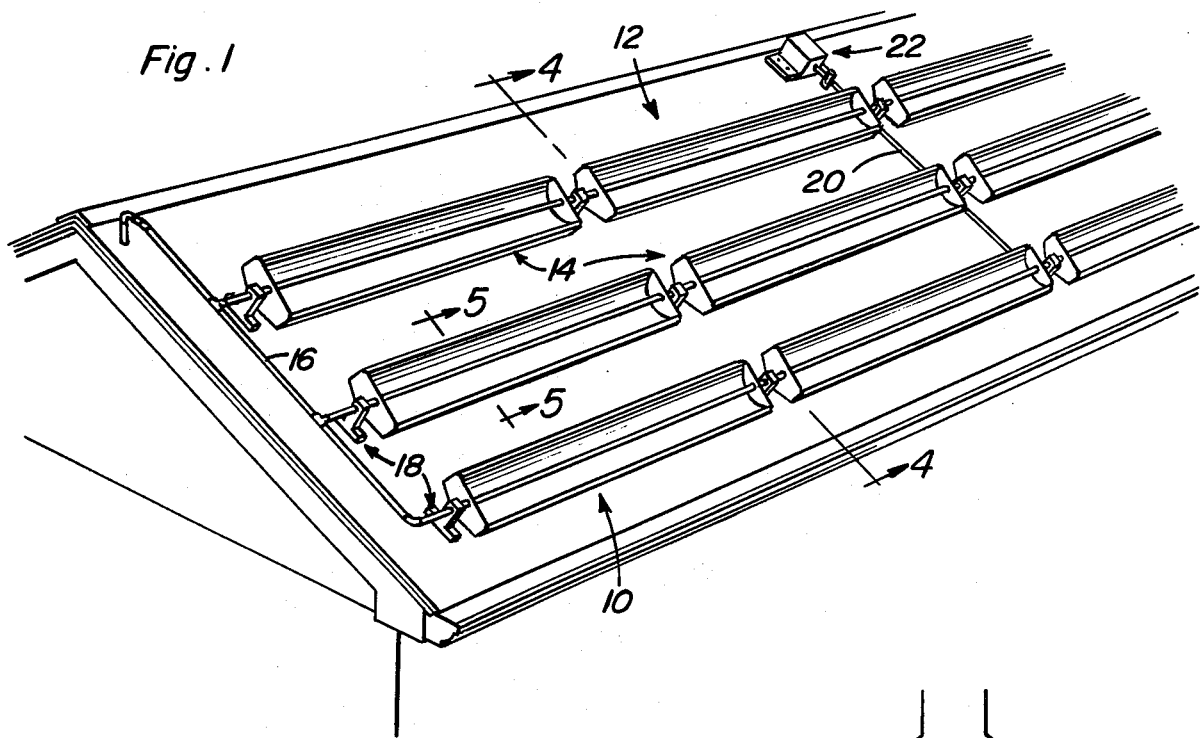
FIG. 1 is a fragmentary, schematic, perspective view showing one possible array of solar collectors according to the present invention.
Figure 2:
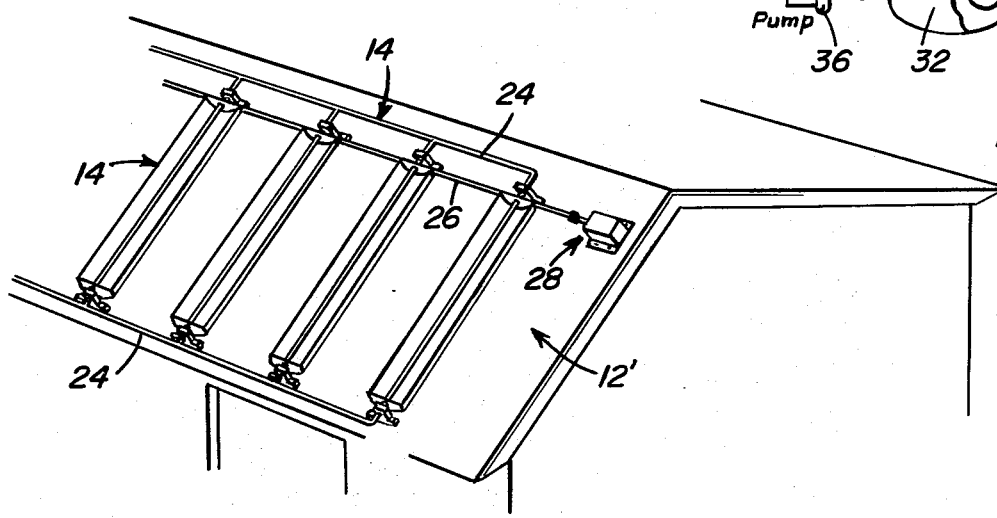
FIG. 2 is a fragmentary, schematic, perspective view showing a second possible array of solar collectors according to the present invention.

Referring now more particularly to FIGS. 1 and 2 of the drawings, an array 10 of generally horizontally extending elements and an array 10' of generally vertically extending elements are shown as disposed on pitched roofs 12 and 12', respectively. Although both roofs 12 and 12' are illustrated as being of standard pitch, the array 10' shown in FIG. 2 has been found particularly suited for high pitch roofs which have a roof angle of, for example, 45° to 60°. Each array 10 and 10' includes one or more solar collectors 14 connected together in series and/or parallel to feed heated water into a common solar energy exploiting system.

Array 10 includes in addition to a plurality of series/parallel arranged collectors 14, a pipe 16 running from the peak to the gutter of roof 12. By appropriate connection of this pipe 16 to the collectors 14, a continuous circuit can be provided, with it being understood that advantageously there is another pipe (not shown) disposed substantially parallel to pipe 16 at the other end of roof 12 in order to have the heat receiving medium flow into the bank of collectors 14 at one end and flow out at the other end. Collectors 14 are themselves appropriately journaled in suitable stands 18 provided with openings for such purpose, and are connected by suitable cranks to a rod 20 itself connected to a suitable sun finder 22, which may be nothing more than a solenoid motor and an associated timing device. Since devices capable of performing the function of finder 22 are well known and conventionally employed, the construction of such a device will not be described herein.

In a manner similar to array 10, array 10' includes a pair of substantially parallel pipes 24 arranged bracketing the collectors 14. A rod 26 is pivotally connected to each of the collectors 14 and to a sun finder 28 similar to finder 22 for causing collectors 14 to rotate about their axes of rotation and follow the sun across the sky. For example, each collector 14 may make approximately a 180° rotation during a normal day in an open location away from high mountains, and the like.

Figure 3:
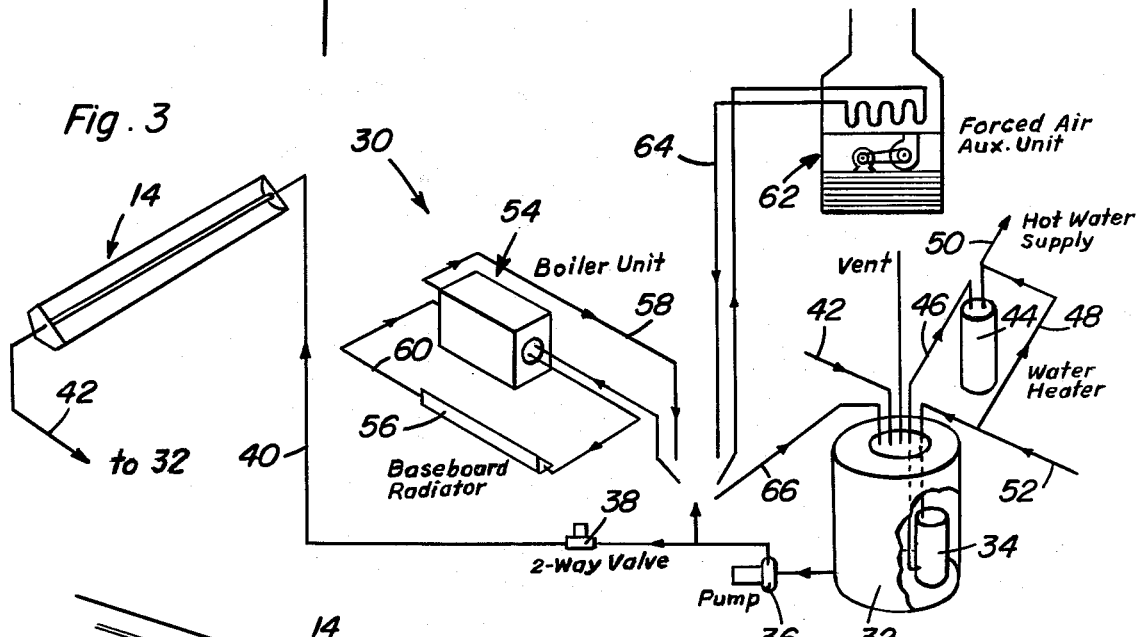
FIG. 3 is a flow diagram showing a heating system which can employ a solar collector or array of collectors according to the present invention.

Referring now more particularly to FIG. 3, a solar energy system 30 employing one or more solar collectors 14 according to the present invention includes a large tank 32 having a smaller tank 34 disposed therein. An outlet of tank 32 passes through a pump 36 and a conventional two-way valve 38 to a line 40 connected to a collector 14. The output of collector 14 goes through line 42 and back into the top of tank 32.

The purpose of tank 34 is to supply preheated water to a conventional water heater 44. Of course, tank 34 could be used by itself as a hot water heater if sufficient energy is available and the temperatures achieved by water in tank 34 are adequate for the needs of the residence or other building being provided with the solar energy. A line 46 passes water from tank 34 to the water heater 44, while a line 48 provides a cold water bypass to an output 50 of water heater 44 from a cold water input 52 of tank 34 in order to permit mixing of the hot water being emitted by heater 44 with cold water and obtain desired water temperatures.

A conventional boiler unit 54 is shown as being associated with a conventional baseboard radiator 56, and the like, by respective closed circuits 58 and 60. The reason for the separate circuits 58 and 60 passing through boiler unit 54 is because the heat absorbing medium employed in the solar collectors 14 may not be water, and the like, but rather a suitable heat transfer material such as a refrigerant or lithium in liquid state. The boiler unit 54 is generally provided for adding any heat necessary to the medium passing through circuit 58 so as to provide heat needed to radiator 56 as demand dictates.

In addition to, or preferably in place of, boiler unit 54 is a conventional forced air unit 62 with the fire box deactivated and heat transfer coils arranged therein. The illustrated coils form part of a circuit 64 connected to the output of tank 32 for supplying hot water to the fire box area of unit 62 and causing air passed over the coils of circuit 64 to be distributed into a space being heated.

A line 66 is provided for being selective connected to the output of tank 32 between pump 36 and valve 38 such that whenever neither unit 54 or 62 is being employed the water from tank 32 which would ordinarily be diverted to these heating units is simply routed back into the top of tank 32 for recirculation.

Referring now more particularly to the embodiment of the invention shown in FIGS. 4 through 6 of the drawings, a solar collector 14 according to the invention includes a heat collector 68 and a reflector arrangement including a collector element 70 disposed for directing radiation from the sun, and the like, onto collector 68. Both collector 68 and reflector element 70 are mounted on a support assembly in such a way that opposed forces are exerted on reflector element 70 so as to bias element 70 toward a parabolic contour permitting focusing of rays toward the collector 68. As can be seen from the drawings, collector 68 is generally in the form of a pipe or tube of finite diameter. Thus, although the reflector element 70 does not obtain a true parabolic curve in section, the rays will be focused sufficiently close to a single line represented by the axis of collector 68 in order to achieve an efficiently operating solar collector.

Reflector element 70 is formed by a, for example, sheet of metal, and the like, having a certain amount of resiliency and provided with a reflecting surface 72 disposed facing the heat collector 68. Surface 72 can be made reflecting in a conventional manner, such as by polishing or bonding a reflection surface to it, or as by the provision of a layer of synthetic material by use of well known vacuum depositing coating techniques, and the like. Further, the substantially rectangular, normally substantially planar configuration of the element 70 provides same with a pair of spaced, substantially parallel, peripheral edges 74. It is to these edges 74 to which a suitable force is applied in order to cause element 70 to bend into a generally parabolic contour, although a true parabolic contour is probably never quite achieved.

The support assembly includes a casing 76 of generally conventional sheet-metal construction, although other materials than a metal may be employed, terminating along longitudinal sides thereof in a pair of angularly inwardly directed lips 78. These lips 78 form a pair of spaced, opposed, attachment points which engage with the peripheral edges 74 of element 70 to exert the requisite force on the edges 74 in order to bend the element 70. Accordingly, the distance between the lips 78 of casing 76 must be a distance substantially less than the distance between the edges 74 of element 70 when the latter is in a planar state in order to obtain the requisite biasing of element 70 and cause the reflecting surface 72 to approach a parabolic contour.

Suitable braces 80 may be disposed within casing 76 between the lower portions of lips 78 and the bottom portion of the casing 76 for rigidifying same, while end caps 82 are placed over the end portions of the casing 76 and are provided with holes 84 which receive the pipe forming the heat absorbing collector 68 and journaling the casing 76 on the collector 68. From this construction, it will be appreciated that it is the casing 76 and its associated reflector element 70 that is rotated by the finders 22 and 28 (FIG. 3), while the pipes forming the heat absorbing collectors 68 remain stationary.

Whether rays from the sun are focused onto a region rather than a point is not important as long as all of the rays striking the reflector surface 74 are focused upon the heat absorbing collector 68. The latter must be of some finite size in order to contain an absorbing fluid of some sort, and it can be shown that the larger the focal region and, thus, the size of heat absorbing element or collector 68, the lower will be the attainable temperature of the collector 68. Accordingly, the focal region must be suitably small for given application. Nevertheless, even a pipe of optimum size with respect to heat collection will form a focal region of sufficient size to permit efficient focusing of rays thereon by a reflector, such as reflector surface 72, constructed in accordance with the invention.

A second preferred embodiment of a solar collector according to the present invention is shown in FIGS. 7 through 9 and 11 of the drawings. This embodiment of the invention includes a reflector element 86, which is in this case a sheet of synthetic or other flexible sheet material, such as polyester or polycarbonate, provided with a reflecting surface 88, which can be a metal such as aluminum vacuum deposited or otherwise adhered to the flexible sheet by techniques well known and accordingly not discussed herein, and having a pair of ends 90 to which are bonded in a suitable manner by conventional techniques a pair of strips 92 of suitable dimensions. These strips 92 may be constructed from a suitable metal or other material having the requisite resiliency to oppose the forces applied to the longitudinally spaced ends thereof by lips 78 of a casing 76 in order to cause strips 92 to be biased toward a parabolic curve. Of course, the element 86 will also be biased toward the desired parabolic contour since the strips 92 are appropriately bonded, or otherwise suitably attached, to the element 86.

Springs 94 or other suitable resilient elements are advantageously fastened to strips 92 and inserted in apertures 96 provided in end caps 98 of casing 76 for tensioning the element 86 and assuring that the sheet which forms the element 86 will retain its desired contour. That is, the use of the springs 94, and the like, to provide a tension transversely of the curve of element 86 will prevent the element 86 from sagging and otherwise misfocusing rays being reflected from surface 88.

In order to further assure that element 86 maintains its desired shape, one or more strips 100, similar to strips 92, may be inserted within casing 76 between lips 78 and between the strips 92 to aid in maintaining the proper reflector shape. These auxiliary strips 100 can be bonded to element 86 or not as desired.

As mentioned above, although it is not necessary to attach strips 100, or strips 92 for that matter, to elment 86, FIG. 11 shows a layer of adhesive 106 between the strip 100 and element 86 for bonding the strip to the element.

The embodiment shown in FIGS. 4 through 6 and 7 through 9 and 11 of the drawings form collector shapes with too little curvature along the edges 74 and 74' to achieve a true parabolic curve. Actually, the curvature at the edges 74, 74' can be shown to be zero while the curvature for parabolic shape is not zero at this point. As a consequence, the sun rays become more scattered in the focal region represented by the axis of collector 68. This is not a serious defect for certain applications, such as heating water to near boiling temperatures for space heating applications, however. For power generating applications, on the other hand, high temperatures are required and a more nearly parabolic reflector shape would be of value. Several approaches will now be discussed for modifying the basic construction of a reflector according to the present invention to achieve a more nearly parabolic shape when such is desired.

For example, the strips 92 and 100 of the embodiment shown in FIGS. 7 through 9 and 11 can be preformed in an essentially parabolic shape so that the resulting reflector shape would be parabolic. This preforming, of course, adds to the cost of the resulting reflector, although not nearly to the degree as attempting to roll an entire sheet of metal, and the like, into parabolic shape.

Another technique is shown in FIG. 12 of the drawings. This approach differs from that of those above in that a moment or couple is applied to a reflector element 108 at the peripheral edges 110 thereof, as by suitable torsion springs (not shown), in addition to or in lieu of the opposed straight line forces applied to the reflector elements in the embodiment described above. It is to be understood that the reflector element 108 can be either a single sheet of metal or other generally resilient material, or can be the composite reflector element which employs the strips 92 to achieve the curvature of the reflector surface. In any event, the application of the aforementioned torsion forces has the effect of adding additional curvature to the reflector shape, especially adjacent the edges 110, and thus improves the ray concentration within the focal region of the reflector.

Yet another additional step in constructing reflectors according to the invention, but which obtain more nearly parabolic curvatures, is to preform the reflector sheet or strips into a portion of a circular arc by the simple expedient of rolling. Such rolling is much simplier and less costly than attempting to roll a sheet or strips into a generally parabolic curvature. In this case, the initial shape of the material would not flat, but would have a circular arc contour. Upon insertion into the casing 76 of a collector according to the invention, additional shape change would occur to form a reflecting surface closely approximating a parabolic contour.

In a further technique, strips 92' and 100' are advantageously constructed as shown in FIG. 10 wherein the strip is contoured in either width, as shown, or thickness or both in a calculable shape such that when inserted in casing 76 a true parabolic shape of the reflector will be approached. In other words, the cross-sectional area of the strips 92' and 100' preferably varied such that there is a narrow portion 102 in the middle section thereof, with the end sections 104 tapering away from the middle section. In this manner, the strips 92' and 100' will bend in a non-uniform manner in order to achieve a true parabolic curve.

As will be understood from the above description and from the drawings, a solar reflector constructed in accordance with the present invention provides a practical and reasonably efficient reflecting surface from elements which are inexpensively fabricated using conventional mass production techniques. Further, great flexibility is realized from the system inasmuch as a basic set of elements can be employed to construct reflectors having a reflecting surface contour which approaches a parabolic curve only to the degree necessary for a particular application.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A solar collector, comprising, in combination:
   (a) a heat collector;
   (b) reflector means for directing radiation from the sun onto the heat collector;
   (c) support means for mounting the heat collector and reflector means in cooperating relationship and for exerting opposed forces at spaced points on the reflector means and biasing the reflector means toward a parabolic contour focusing rays toward the head collector; and
   (d) the reflector means including a substantially rectangular, normally substantially planar reflector element including a pair of spaced, substantially parallel, peripheral edges, with the support means including a pair of spaced, opposed attachment points engaging the peripheral edges of the reflector element, the attachment points being spaced from one another a distance less than a distance between the peripheral edges of the reflector element for biasing the reflector element toward the desired parabolic contour, the reflector means further including a resilient strip engaging the attachment points and partially overlying and abutting the reflector element for biasing the reflector element toward a parabolic contour.

2. A structure as defined in claim 1, wherein the reflecting element is formed by a sheet of flexible material provided with a reflecting surface and having ends disposed perpendicular to the peripheral edges of the reflecting element, with the strip being a pair of strips attached to the sheet at the ends thereof and engaging with the attachment points of the support means for biasing the sheet toward a parabolic contour.

3. A structure as defined in claim 2, wherein torsional moments are applied to the reflector element at the peripheral edges thereof, with each of the moments acting in a direction opposite to and toward the other of the moments for adding additional curvature to the element adjacent the peripheral edges thereof and improving ray concentration to the heat collector.

4. A structure as defined in claim 2 wherein the strip is preformed into a curved shape.

5. A structure as defined in claim 2, wherein the forces are torsional moments.

6. A solar collector, comprising, in combination:
   (a) a heat collector;
   (b) reflector means for directing radiation from the sun onto the heat collector;
   (c) support means for mounting the heat collector and reflector means in cooperating relationship and for exerting opposed forces at spaced points on the reflector means and biasing the reflector means toward a parabolic contour focusing rays toward the heat collector; and
   (d) the reflector means including a substantially rectangular, normally substantially planar reflector element including a pair of spaced, substantially parallel, peripheral edges, with the support means including a pair of spaced, opposed attachment points engaging the peripheral edges of the reflector element, the attachment points being spaced from one another a distance less than a distance between the peripheral edges of the reflector element for biasing the reflector element toward the desired parabolic contour, the reflecting element being formed by a sheet of flexible material provided with a reflecting surface and having ends disposed perpendicular to the peripheral edges of the reflecting element, with a pair of strips being attached to the sheet at the ends thereof and engaging with the attachment points of the support means for biasing the sheet toward a parabolic contour, with the strips being each longitudinally extending and vary in cross-sectional area along the longitudinal extent thereof, the variation being selected for assuring that the strip will tend to form a parabolic curve when mounted on the support means.

7. A structure as defined in claim 6, further including control means for moving the reflector element about the heat collector at a rate corresponding to the movement of the sun, and storage and distribution means connected to the heat collector for receiving a heat absorbing medium from the collector and storing and distributing the medium, and returning the medium to the heat collector for reheating.

8. A solar collector, comprising, in combination:
   (a) a heat collector;
   (b) reflector means for directing radiation from the sun onto the heat collector;
   (c) support means for mounting the heat collector and reflector means in cooperating relationship and for exerting opposed forces at spaced points on the reflector means and biasing the reflector means toward a parabolic contour focusing rays toward the heat collector; and
   (d) the reflector means including a substantially rectangular, normally substantially planar reflector element including a pair of spaced, substantially parallel, peripheral edges, with the support means including a pair of spaced, opposed attachment points engaging the peripheral edges of the reflector element, the attachment points being spaced from one another a distance less than a distance between the peripheral edges of the reflector element for biasing the reflector element toward the desired parabolic contour, the reflecting element being formed by a sheet of flexible material provided with a reflecting surface and having ends disposed perpendicular to the peripheral edges of the reflecting element, with a pair of strips being attached to the sheet at the ends thereof and engaging with the attachment points of the support means for biasing the sheet toward a parabolic contour, with a resilient member being connected to one of the strips and to the support means for tensioning the sheet and assuring that the sheet maintains the desired shape imparted thereto by the strips.

9. A structure as defined in claim 8, wherein a further flexible strip is inserted between the attachment points and between the ends of the sheet for further biasing the sheet toward a parabolic contour.

10. A structure as defined in claim 9, wherein torsional moments are applied to the reflector element at the peripheral edges thereof, with each of the moments acting in a direction opposite to and toward the other of the moments for adding additional curvature to the element adjacent the peripheral edges thereof and improving ray concentration to the heat collector.

11. A structure as defined in claim 10, wherein the strips are each longitudinally extending and vary in cross-sectional area along the longitudinal extent thereof, the variation being selected for assuring that the strip will tend to form a parabolic curve when mounted on the support means.

* * * * *